May 8, 1945.　　　　M. G. FENOSA　　　　2,375,295
APPARATUS FOR FIXING THE TOOL IN THE LATHE
Filed Aug. 25, 1942
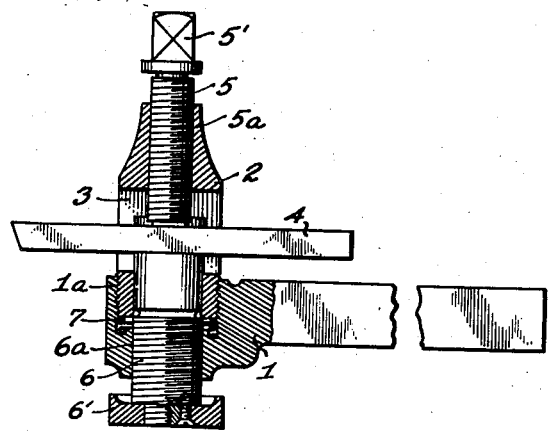
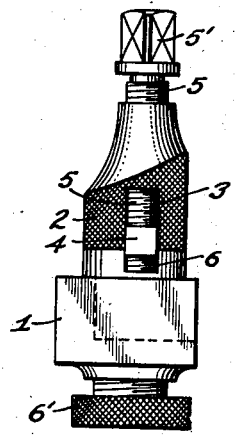
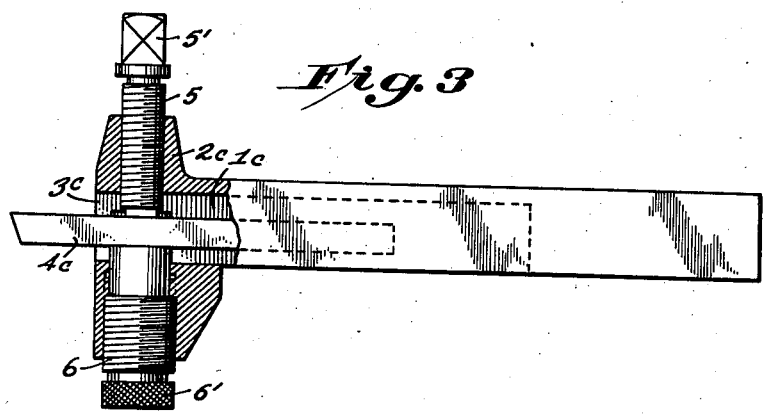
Inventor
MIGUEL GARRIGA FENOSA
By
Attorneys Patented May 8, 1945

2,375,295

UNITED STATES PATENT OFFICE 2,375,295

APPARATUS FOR FIXING THE TOOL IN THE LATHE

Miguel Garriga Fenosa, Barcelona, Spain

Application August 25, 1942, Serial No. 456,071
In Spain October 21, 1941

4 Claims. (Cl. 82—36)

This invention relates to improvements in tool holders for lathes and has for its object to provide a holder wherein the tool may be adjusted and rigidly clamped in position by a novel arrangement of clamping screws.

In the accompanying drawing wherein an approved embodiment of the invention is illustrated;

Figure 1 is a side elevation partly in section of the improved tool holder.

Figure 2 is a front elevation of the holder.

Figure 3 is a side elevation similar to Figure 1, showing a modification of the invention.

Referring to the embodiment illustrated in Figures 1 and 2, the holder is shown as consisting of a support 1 which may be fixed on the lathe in the usual manner and which is provided with a groove 3 through which the tool 4 passes. The tool is fixed in position in the groove 3 by two clamping screws 5 and 6, the extremities of which act, respectively, on the upper and lower faces of the tool 4.

The top clamping screw 5 is threaded in a bore 5a provided in the upper part of the body 2 while the screw 6 is threaded in a bore 6a formed in the extremity of the support 1. Consequently, the ends of the screws are applied respectively to the upper and lower faces of the tool 4 to hold and fix the tool between them at the desired height, depending upon the adjustment of the two screws.

The body 2 is also threaded in an enlarged portion 1a of the bore 6a and by virtue of this arrangement the tool may be turned into the desired angular position with respect to the work, the body 2 rotating on the support 1 in a manner similar to a terret. Normally the body 2 is forced upwardly by the tension of a spring 7 confined between the lower end of the body 2 and the shoulder formed by the enlargement 1a of the bore through the support. The spring 7 acts to take up loose movement between the support 1 and the body 2 and to yieldably hold the latter in adjusted angular position prior to tightening the parts.

In use, the support 1 is mounted in the lathe in the usual manner and the body 2 is threaded in the bore 1a taking care to leave sufficient play so that the body may be turned to the desired angular position. The tool 4 is placed in the groove 3 and the head 6' of the bottom clamping screw 6 is turned until its free end engages the tool 4 and lifts said tool to the desired height.

The head 5' of the top clamping screw 5 is then turned until its lower end mildly engages the top face of the tool 4, taking care not to fully tighten the top screw. The body 2 is then turned so that the tool 4 occupies the desired angular position with respect to the work and finally the top clamping screw 5 is tightened thereby firmly fixing the entire assembly in adjusted position. In this condition, the tool 4 is clamped between the screws 5 and 6 and the oppositely directed forces thus applied to the support 1 and the body 2 act to hold the latter in fixed relation.

Figure 3 illustrates a simplified form of the invention which does not permit the angular adjustment of the tool 4c because the body 2c and the support 1c are formed as a single integral piece in which the tool receiving groove 3c is provided. In this case the spring 7 is omitted and the tool is clamped in place between the screws 5 and 6 which latter may if desired be inclined with respect to the support 1a. As shown in Figure 2 the groove 3 and the clamping screw 5 may be laterally disposed with respect to the clamping screw 6 and, as will be understood, the threads of the screws may have any desired pitch. Also, the heads 5' and 6' of the clamping screws may be removable if desired.

I claim:

1. A tool holder for lathes comprising a supporting body, a post threaded and rotatable in said body and having a tool receiving slot therein, and opposed members respectively carried by the body and the post for clamping a tool in adjusted position axially of said slot and operable to clamp said post in angularly adjusted position with respect to said body.

2. A tool holder for lathes comprising a supporting body, a post threaded and rotatable in said body and having a tool receiving slot therein, a tool clamping member threaded in said body, and a tool clamping member threaded in said post, said clamping members being operable in clamping position, to apply pressure to the interengaging threads of the post and body and thereby secure the post in adjusted angular position with respect to said body.

3. A tool holder as claimed in claim 2, wherein the slot in said post and the second mentioned clamping member are disposed eccentrically with respect to the axis of the first mentioned clamping member.

4. A tool holder as claimed in claim 2, wherein the first and second mentioned clamping members are axially displaced.

MIGUEL GARRIGA FENOSA.